LINE IDENTIFICATION IN TELECOMMUNICATION SYSTEMS

Filed June 23, 1954 3 Sheets-Sheet 1

Inventors
F. H. BRAY
P. M. KING
G. C. HARTLEY
By Robert Harding Jr.
Attorney

LINE IDENTIFICATION IN TELECOMMUNICATION SYSTEMS

Filed June 23, 1954 3 Sheets-Sheet 2

Inventors
F H BRAY
P M KING
G C HARTLEY
By Robert Harding Jr.
Attorney

LINE IDENTIFICATION IN TELECOMMUNICATION SYSTEMS

Filed June 23, 1954

3 Sheets-Sheet 3

Inventors
F. H. BRAY
P. M. KING
G. C. HARTLEY
By Robert Harding Jr.
Attorney

United States Patent Office 2,913,530

Patented Nov. 17, 1959

2,913,530

LINE IDENTIFICATION IN TELECOMMUNICATION SYSTEMS

Frederick Harry Bray, Peter Morris King, and George Clifford Hartley, London, England, assignors to International Standard Electric Corporation, New York, N.Y.

Application June 23, 1954, Serial No. 438,719

Claims priority, application Great Britain July 3, 1953

8 Claims. (Cl. 179—18)

The invention relates to the identification of individual lines in telecommunication systems in which large numbers of lines can be interconnected for communication purposes of various kinds, e.g. telephony, telegraphy, remote control and supervision.

It is desirable in such systems to identify lines under various circumstances, such as for determining the identity of lines engaged in making trunk connections. It is also desirable in some circumstances to automatically make records of such determined identities with or without other information pertinent to a connection.

In telecommunication systems, identification circuits are known in which the potential applied to the metering or "hold," or the metering and hold wire is temporarily altered to bring about operation of an identification circuit capable of finding the line to be identified. The control of such an arrangement may be effected over any one of a number of circuits such as junction circuits, to which any of the lines to be identified may be connected by automatic selective means and in order that such an arrangement may be economical, the amount of equipment individual to each line to be identified and the amount of equipment individual to each junction circuit over which control is to be effected, must be small and cheap and easily mounted. Furthermore, the amount of equipment common to the said lines and junctions must also be small and cheap.

In a line identification system according to the invention, selection of a line to be identified is avoided. The main feature of the invention consists in equipment for identifying any one of a group of electrical signalling lines each having a numerical identity, which comprises a set of unidirectional current carrying devices per line, the number of devices in each set being equal to the number of digits in the numerical identity of the lines, registering means capable of registering the numerical identity of any of the lines, and permanent connections on the one hand between the lines and their respective sets of unidirectional current carrying devices and on the other hand between the unidirectional current carrying devices and the registering means such that an identification potential applied to any one of said lines will directly operate said registering means to register the separate digits of the line identity.

Other features of the invention will be understood from the following description in which an embodiment of the invention as applied to a telephone system is described in conjunction with the accompanying drawings in which.

Figures 1, 2, 3:
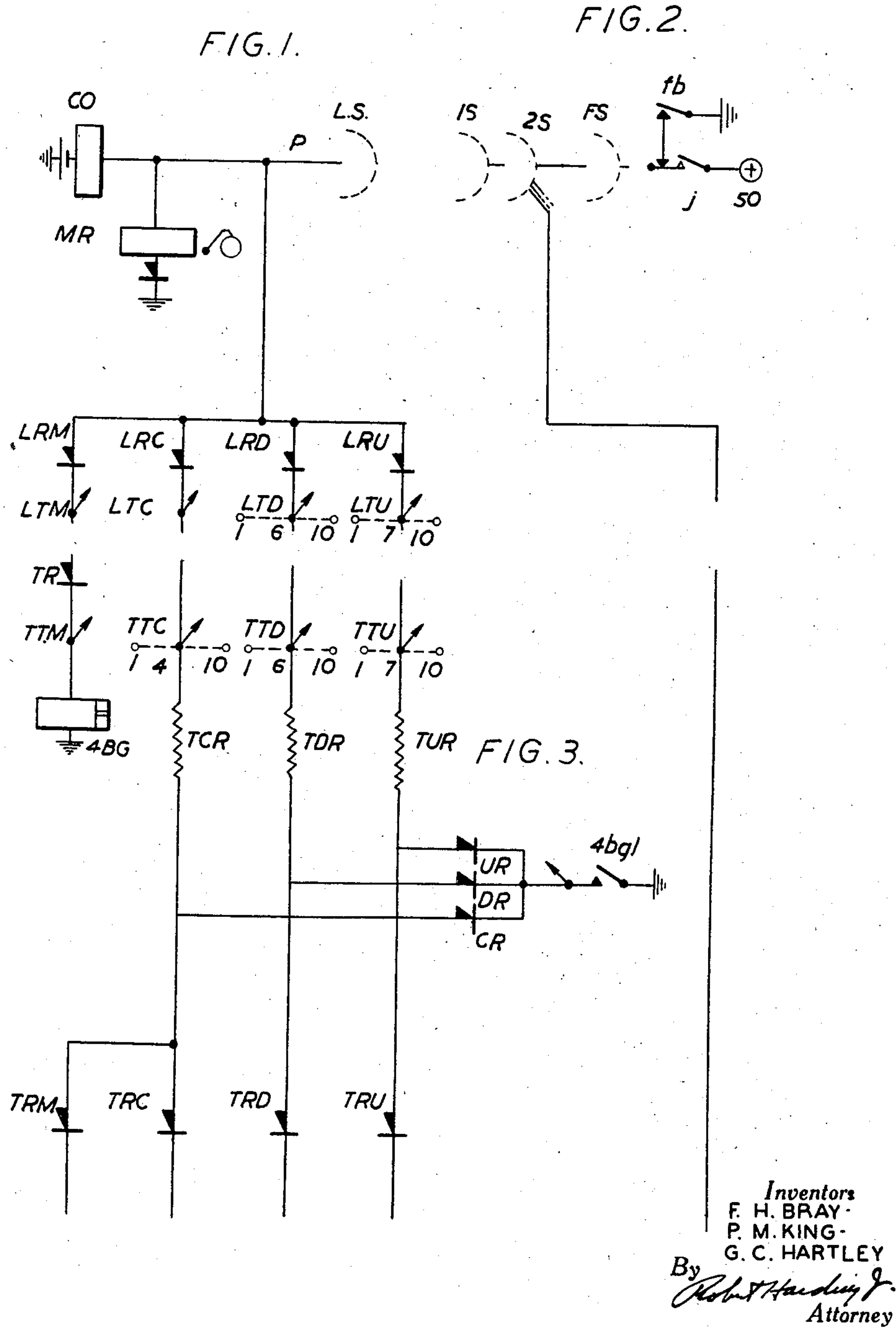
Fig. 1 shows a relevant portion of a known line circuit, modified to include line identity equipment according to the invention.
Fig. 2 shows, diagrammatically, portions of a known automatic telephone exchange.
Fig. 3 shows identity equipment per 1000 lines.
Figure 4:
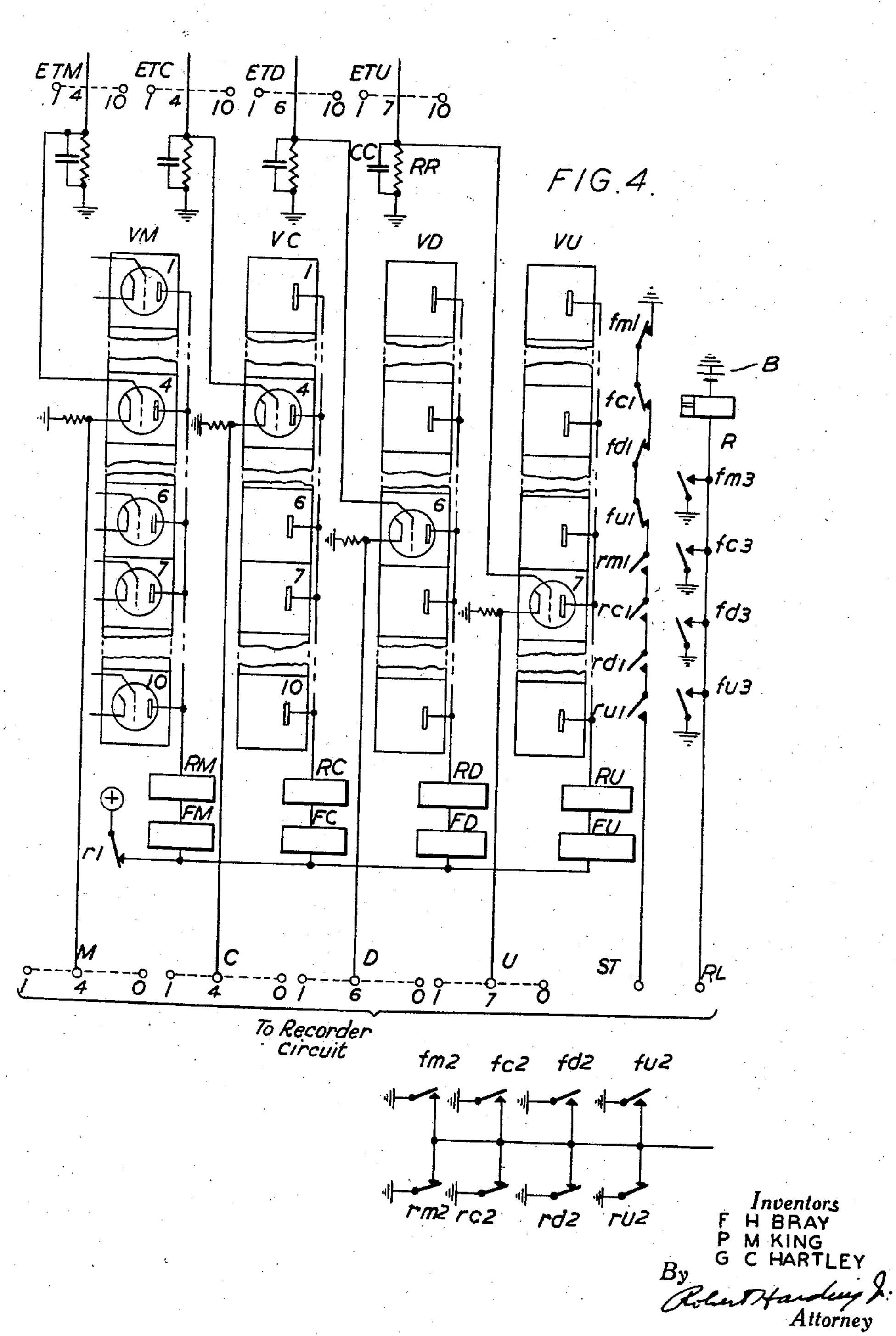
Fig. 4 shows identity equipment per 10,000 lines.
Figures 5, 6:
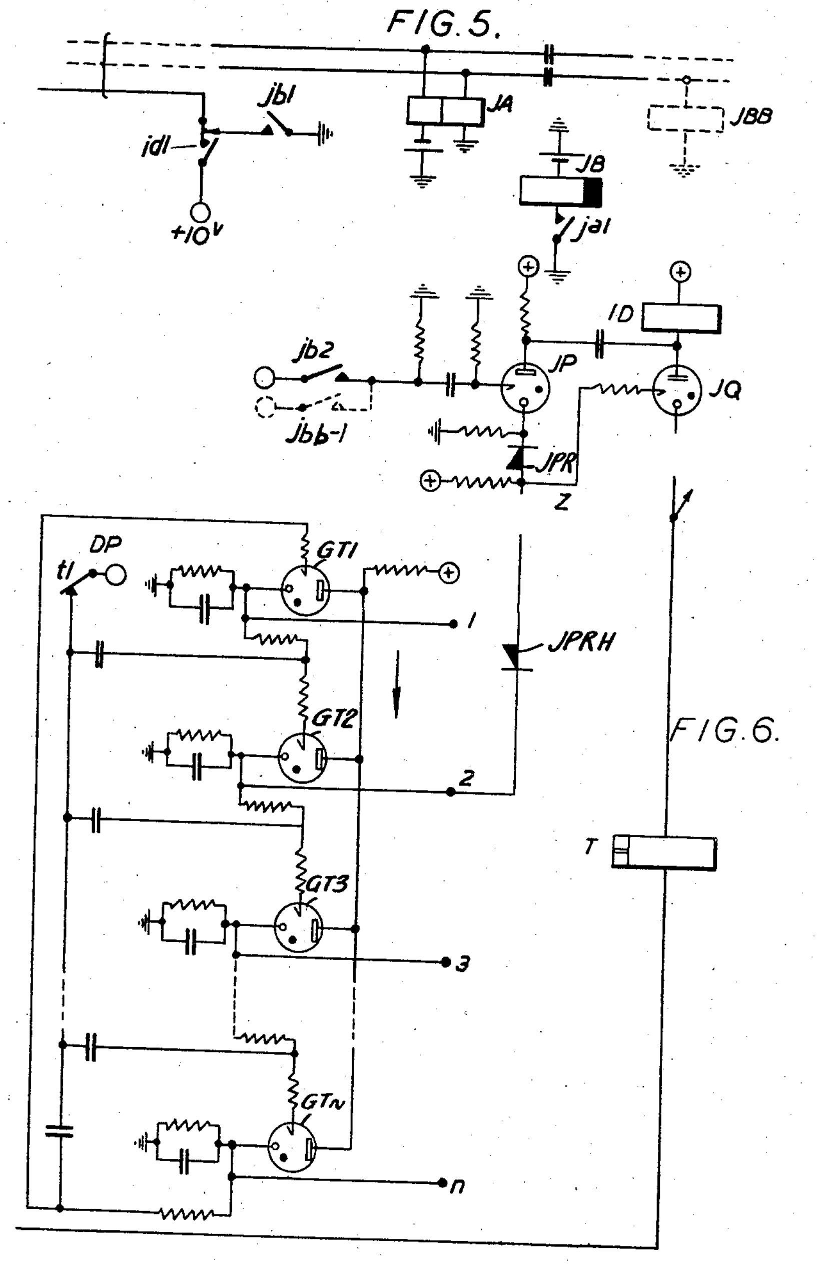
Fig. 5 shows a relevant portion of a known out-going junction circuit, modified to include line identity signalling means according to the invention.
Fig. 6 shows a junction hunting circuit.

The drawings may be assembled by placing Figs. 5 and 6 to the right of Fig. 4, and Fig. 3 above Fig. 4.

In the description which follows, it is to be understood that some connections, such as local and short distance connections, are metered by 50 v. booster metering in well known manner and that in the case of other connections, such as long distance connections, it is required to record automatically the identity of a line making a connection. For the sake of simplicity it is assumed that all connections to be booster-metered are extended over a circuit such as the final selector circuit in Fig. 2 and that the connections requiring an automatic record of the identity of the calling line are extended over a circuit such as the junction circuit in Fig. 5.

Each line circuit is arranged as shown in Fig. 1 with its cut-off relay CO and its message register MR connected to the hold and metering wire P which, when a call is set up via a line switch LS and first and second selectors 1S and 2S to a final selector FS or to an outgoing junction Fig. 5, is earthed by a contact *fb* in Fig. 2 or *jb1* of a relay FB (not shown) or JB (Fig. 5) in the final selector or junction circuit, respectively. The relay CO which is connected to negative battery and was operated when the connection was extended through the line switches, LS, IS, etc., remains operated but the message register MR which is connected via a rectifier to earth is not operated at this time.

Each line circuit is equipped with four rectifiers LRM, LRC, LRD and LRU connected on one side as shown to the P wire of the circuit and on the other side to appropriate terminals LTM, LTC, LTD and LTU as will be further explained.

The line circuits are arranged in well known manner in hundred line groups, all the line circuits in the same hundred line group having the same thousands and hundreds designation and differing only in their tens and units designations.

In like manner the groups of hundred line circuits are arranged in groups of thousand line circuits, all the groups of hundred line circuits having the same thousands designation being in the same group of thousand line circuits. There is provided for each hundred line group one terminal LTM which may be regarded as the "thousands" terminal and to which one rectifier of each line circuit of the group is connected. There is also provided one "hundreds" terminal LTC to which another rectifier, LRC of each other line circuit of the group is connected. Further there are provided 10 "tens" terminals LTD numbered 1 to 10 and 10 "units" terminals LTC numbered 1 to 10.

A further LRD rectifier from each other line circuit is connected to the appropriate "tens" terminal dependent on the tens digits of its designation and likewise a further rectifier to the appropriate "units" terminal dependent on the units digit of its designation. Thus, assuming the P wire in Fig. 1 belongs to a line circuit having the designation 4467, its rectifiers are connected as follows: rectifier LRM is connected to the terminal LTM, rectifier LRC to the terminal LTC, rectifier LRD to the sixth terminal LTD and rectifier LRU to the seventh terminal LTU.

The terminal LTM is now connected through a rectifier TR to a terminal TTM (Fig. 3) to which are also connected in like manner the other LTM terminals from the other 9 groups of line circuits having the same "thousands" designation, namely 4. There is thus connected to the terminal TTM via the appropriate rectifiers one thousand line circuits all having the thousands designation 4. As will be seen in Fig. 3 there are also provided ten terminals TTC and ten terminals each TTD and TTU. The terminals LTC, LTD and LTU are connected to the appropriate terminals TTC, TTD and TTU according to their numerical significance so that to any terminal TTC there are connected one hundred line circuits all bearing the same hundreds digit (and, as already explained the same thousands digit) in their identity designation. In like manner each of the terminals TTD and TTU have connected to them one hundred line circuits each having respectively the same tens or the same units digit, in addition to having the same thousands digit in their identity designation.

In the example illustrated in the drawings it is assumed that the circuit in Fig. 3, is for the fourth group of thousand line circuits in an exchange having not more than ten such groups. There are thus as many more thousand line identity equipment circuits like Fig. 3 as there are groups of thousand line circuits or partial thousand line circuits in the exchange, each having connected to it in the manner described the P wire of the appropriate line circuits.

There is provided in the exchange one identity equipment as shown in Fig. 4 which will be later described and to which each of the various circuits according to Fig. 3 are connected in the following manner.

The circuit of Fig. 4 comprises four sets of 10 terminals each, designated respectively ETM, ETC, ETD and ETU. Each terminal TTC (Fig. 3) from every thousand line identity equipment circuit is connected via an individual resistance TCR to two individual rectifiers TRM and TRC which are in turn connected to the appropriate ETM and ETC terminals respectively, according to the thousands and hundreds designations of the line circuits to which they are connected as already described. In like manner, each terminal TTD and TTU (Fig. 3) from every thousand line identity equipment circuit is connected via individual resistances TDR and TUR and individual rectifiers TRD and TRU respectively to the appropriate ETD and ETU terminals respectively, according to the tens and units designations of the line circuits to which they are connected as already described.

Referring again to Fig. 3, the terminal LTM is connected via an individual rectifier TR to terminal TTM and thence to earth through the winding of a relay 4BG, which relay is arranged to operate when positive 50 volts is applied for metering purposes to any P wire to which it is connected via appropriate rectifiers but not when positive 10 volts is applied for identification purposes, as will be later explained, to any such P wire nor when negative is applied through any of the CO relays.

To the terminal TTM there are also connected, via individual TR rectifiers the LTM terminals of the other groups of hundred line circuits having the same thousands designation.

The operation of relay 4BG is arranged to apply earth, through contacts 4*bg*1 and appropriately connected individual rectifiers such as CR, DR and UR, to all the terminals TTC, TTD and TTU of the thousand line identity equipment to which the relay 4BG belongs.

Turning now to Fig. 4 it will be appreciated that one thousand line circuits, all having the same thousands designation digit, are connected, as already described, to each of the terminals ETM and likewise one thousand line circuits, all having the same hundreds designation digit, are connected to each of the terminals ETC, while one thousand line circuits, all having the same tens designation digit, are connected to each of the terminals ETD and one thousand line circuits, all having the same units designation digit, are connected to each of the terminals ETU. Furthermore, it will be appreciated that the appropriate terminal in each of the terminal sets ETM, ETC, ETD and ETU will assume a positive potential of approximately 10 volts when the P wire of a line circuit is raised to a positive potential of 10 volts, provided that the appropriate BG relay is not operated to apply ground over the 4*bg*1 contact. For example, assume that the P wire of line circuit having the designation 4467 (Fig. 1) has a positive 10 volt potential applied to it. Since the terminals ETM4, ETC4, ETD6 and ETU7 are connected thereto as already described, each of these four terminals will assume a positive potential of approximately 10 volts, always provided that the contacts 4*bg*1 are not closed, that is to say, provided that relay 4GB is not operated by a positive 50 volt potential applied to one or more of the P wires of any of the other line circuits in the same thousands group.

Each of the terminals ETM, ETC, ETD and ETU is connected to earth through an individual delay network consisting of a condenser CC and a resistance RR. The purpose of the delay networks is to delay the rise in potential of the terminals to which they are connected for a sufficient time to allow the appropriate BG relay to operate if a metering operation is in progress.

Each of the terminals ETM, ETC, and ETD and ETU is also connected to the appropriate control electrode of a number of signal amplifying tubes such as thyratrons. As shown in Fig. 4, tubes VM, VC, VD and VU are arranged in four groups of 10, the tubes VM1–10 denoting the thousands digits and being connected, as explained, to terminals ETM1–10, tubes VC1–10 denoting the hundreds digits and being connected to terminals ETC1–10, and so on. The cathode of each tube is connected through its individual resistance RC to earth and also to the appropriate one of the terminals M, C, D, U of a suitable recording circuit which may be coupled to a tape or card punching machine or any other suitable recording device. The recording device has a start terminal ST to which it is necessary to apply an earth to start the device, and a stop terminal RL, to which the device applies an earth at the end of each operation. A relay R is serially connected between the terminal RL and a suitable source of operating potential B.

The anodes of tubes VM1–10 are connected together and through two relays RM and FM and contact *r*1 associated with relay R to positive battery. In like manner the anodes of tubes VC1–10, VD1–10 and VU1–10 are connected together in groups and through current responsive relays RC, FC, RD, FD, RU, FU, and contact *r*1 to positive battery, as shown. Each of the relays RM, RC, RD and RU is arranged to operate whenever any one tube in series with it is in conducting condition. The relays FM, FC, FD and FU do not operate unless more than one tube in series therewith is in conducting condition, it being understood that two tubes draw more anode current than does a single tube. The relays RM, FM, RC, FC, RD, FD, RU and FU have respective contacts in a chain as shown in Fig. 4 to control the application of earth to the start terminal ST, to control relay R and to control the operation of a relay T in Fig. 6.

Turning now to Fig. 5, the seizure of a junction circuit results in known manner in the operation of a line relay JA which in obvious manner operates a positive guard relay JB. The relay JB, at *jb*1 earths the P wire and at *jb*2 applies a pulse to the control electrode of a gas tube JP which causes the tube to fire, thereby recording a request for line identification.

A telephone system normally comprises a number of outgoing junction circuits, several of which may be in use simultaneously and several of which may be requiring line identification at the same time. In order that the junction circuits may be dealt with one at a time, there is provided a junction hunting circuit (Fig. 6). A junction hunting circuit comprises a number of gas tubes GT1 . . . GT*n*, one for each junction circuit to be hunted over, arranged in the form of a well known form of cyclic counter stepped by pulses applied to the terminal DP in the usual manner. The cathodes of the tubes JP of the junction circuits are connected through suitable rectifiers, each to the control electrode 1, 2, 3 . . . *n*, of the tubes of the junction hunting circuit. There is also connected to each tube JP in known flip-flop manner a tube JQ having in its anode circuit a relay ID and in its cathode circuit a relay T common to all the tubes JQ.

The identification of a line circuit connected to an outgoing junction circuit is made in the following manner:

Normally the junction hunting circuit (Fig. 6) is stepping as already described and the firing of the junction circuit tube JP due to seizure of the junction circuit and the operation of its relays JB or perhaps due to the operation over the junction in any convenient manner of a relay JBB and its contacts *jbb1*, for example the relay JB or JBB in Fig. 5, changes the potential of the cathode electrode of tube JP and, when the tube e.g. 2 in the hunting circuit fires a pulse from the cathode thereof fires tube JQ due to a coincidence of potentials at terminal Z. The common relay T operates and at *t1* disconnects the driving pulse source DP and the relay ID in the junction circuit operates and at *id1* connects the P wire to a positive 10 volt supply. At the same time the firing of tube JQ quenches tube JP in known manner.

At the line circuit, Fig. 3, the positive 10 v. passes through the appropriate rectifiers and resistances and causes conduction to occur in the appropriate thyratrons VM4, VC4 VD6, VU7 in Fig. 4. Potentials appear on the appropriate recorder terminals M4, C4, D6, U7 and relays RM, RC, RD, RU operate thereby applying earth to the recorder start terminal ST through front contacts *rm1*, *rc1*, *rd1* and *ru1* in series with back contacts *fm1*, *fc1*, *fd1* and *fu1* and removing earth at opened back contacts *rm2*, *rc2*, *rd2*, *ru2* in parallel, from the circuit of relay T, tube JQ and relay ID. The tube JQ quenches and while relay T is releasing to restart the junction hunting circuit at contact *t1*, and while relay ID is releasing to remove positive 10 volts and restore earth to the P wire, the recorder operates and places earth on terminal RL thereby operating relay R (Fig. 4). Relay R at *r1* opens the anode circuits of the conducting thyratrons and releases relays RM, RC, RD and RU. The circuits are now normal, the whole operation of identifying and recording the line circuit having taken place very rapidly at a time when no metering pulse was present on any line circuit in the thousand line group. As already explained, the presence of such a metering pulse would operate the BG relay (Fig. 3) of the thousand line group which would prevent operation of the thyratrons during the period of the pulse. Should, for any reason, such as line interference, two or more thyratrons be conducting simultaneously in parallel, then as already explained, one or more of relays FM, FC, FD, FU operates and at opened back contacts *fm1*, *fc1*, *fd1*, *fu1* prevent the application of ground to terminal ST thereby precluding the starting of the recorder circuit, while at closed front contacts *fm2*, *fc2*, *fd2*, *fu2* the circuit for relay T, tube JQ and relay ID is maintained and at closed front contacts *fm3*, *fc3*, *fd3*, *fu3*, relay R is operated to ground to open the thyratron anode circuits at opened contacts *r1*. When the various relays in Fig. 4 release, including relay R, the correct thyratrons are then rendered conducting as already explained.

While the invention has been described in connection with an embodiment in which the line circuits are grouped in hundreds and thousands, it will be appreciated that other grouping arrangements may be employed. For example, a relay BG (Fig. 3) may be provided for each 500 lines if the incidence of metering pulses renders this desirable. Furthermore the rectifier LRM (Fig. 1) may be dispensed with if desired and terminal LTM combined with LTC. In such an arrangement the operating current available for the BG relays is likely to be less.

While the principles of the invention have been described above in connection with specific embodiments, and particular modifications thereof, it is to be clearly understood that this description is made only by way of example and not as a limitation on the scope of the invention.

What we claim is:

1. A circuit arrangement for identifying lines connected to a telecommunications exchange comprising a plurality of sets of fixed unidirectional current carrying devices, each set coupled to a different one of said lines, each set including a different one of said devices for each digit of a line designation, registering means for registering the numerical identity of any of said lines, means for applying a plurality of potentials over said lines, coupling means interposed between said devices and said registering means, said coupling means comprising means for selectively responding to a given one of said potentials for actuating said registering means, and switch means for preventing further coupling of said registering means with other of said sets of devices when said registering device is coupled to a given one of said sets in response to said given potential.

2. Equipment as claimed in claim 1 wherein said coupling means comprises potential discriminating means operable to prevent said identification potential from operating said registering means when a potential which is not the identification potental is applied to any one of said lines.

3. Equipment as claimed in claim 1 further comprising a recording device and wherein said registering means comprises means for actuating said recording device to record said separate digits and means operable to prevent said actuation of the recording device when said registering means registers a digit or digits other than the digits of the line identity.

4. Equipment as claimed in claim 1 in which said registering means comprises a plurality of digit registering devices arranged in groups, one group for each digit in the numerical identity of a line.

5. Equipment as claimed in claim 4 wherein digit registering devices comprise a plurality of signal amplifying devices, each coupled to a different one of said devices and adapted to be operated by one of said potentials passed therethrough.

6. Equipment as claimed in claim 3 wherein said registering means comprises cancelling means actuated by said recording device after a record has been made to delete the line identity registered in the registering means.

7. Equipment as claimed in claim 6 and comprising means for limiting the application of said identification potential to one line at a time and means for maintaining an application of potential to a line until the identity of the line has been registered in the registering means.

8. Equipment as claimed in claim 7, further comprising means for applying said identification potential to the line over a junction circuit to which the line is connected and in which said means for limiting the application of identification potential to one line at a time comprises a cyclic junction hunting circuit which stops in turn on each circuit to which a line requiring identification is connected.

References Cited in the file of this patent

UNITED STATES PATENTS

| | | |
|---|---|---|
| 2,338,242 | Haigh | Jan. 4, 1944 |
| 2,484,612 | Dehn | Oct. 11, 1949 |
| 2,580,093 | Hersey | Dec. 25, 1951 |
| 2,694,753 | Den Hertog | Nov. 17, 1954 |
| 2,739,187 | Holden | Mar. 20, 1956 |